United States Patent
Yu et al.

(10) Patent No.: US 12,468,648 B2
(45) Date of Patent: Nov. 11, 2025

(54) BRIDGE DEVICE HAVING DATA MONITORING FUNCTION AND USB TO UART CONVERTER HAVING THE SAME

(71) Applicant: PROLIFIC TECHNOLOGY INC., Taipei (TW)

(72) Inventors: Tien-Wei Yu, Taipei (TW); Chun-Shiu Chen, Taipei (TW)

(73) Assignee: PROLIFIC TECHNOLOGY INC., Taipei (TW)

( * ) Notice: Subject to any disclaimer, the term of this patent is extended or adjusted under 35 U.S.C. 154(b) by 6 days.

(21) Appl. No.: 18/672,146

(22) Filed: May 23, 2024

(65) Prior Publication Data

US 2024/0419621 A1     Dec. 19, 2024

(30) Foreign Application Priority Data

Jun. 14, 2023   (TW) ................................. 112122123

(51) Int. Cl.
   *G06F 13/40*   (2006.01)
   *G06F 13/42*   (2006.01)
(52) U.S. Cl.
   CPC ...... *G06F 13/4059* (2013.01); *G06F 13/4282* (2013.01); *G06F 2213/0042* (2013.01)

(58) Field of Classification Search
   CPC ..................................................... H04L 51/046
   See application file for complete search history.

(56) References Cited

U.S. PATENT DOCUMENTS 6,151,653 A * 11/2000 Lin ..................... G06F 13/4009
                                                          710/305

* cited by examiner

*Primary Examiner* — Henry Tsai
*Assistant Examiner* — Juanito C Borromeo

(57) ABSTRACT

A bridge device having data monitoring function is disclosed. The bridge device can be made to be an integrated circuit (IC) chip, so as to be disposed on a circuit board with a USB connector and a UART connector, thereby forming a USB to UART converter. When using the USB to UART converter, the USB connector is connected to a host computer, and the UART connector is connected to an electronic device. As such, the bridge device provides the host computer with at least three virtual COM ports, such that the host computer is able to conduct a data transmission with the electronic device through one virtual COM port. Moreover, during the data transmission, the host computer is also able to hear the transmitted data by way of diverting the transmitted data through the other two virtual COM ports.

20 Claims, 11 Drawing Sheets

BRIDGE DEVICE HAVING DATA MONITORING FUNCTION AND USB TO UART CONVERTER HAVING THE SAME

BACKGROUND OF THE INVENTION

1. Field of the Invention

The present invention relates to the technology field of USB to UART conversion, and more particularly to a bridge device having data monitoring function and a USB to UART converter using the bridge device.

2. Description of the Prior Art

Universal asynchronous receiver/transmitter (UART) interface, e.g., RS232 connector, RS422 connector or RS485 connector, is broadly used in the early industrial control because of using simple transmission protocol. In addition, the early used personal computer is certainly equipped with RS232 connector for communicating with a modulator-demodulator. However, since possessing the characteristics of "plug and play" and high data transmission rate, universal serial bus (USB) connector has now become the main interface of a host electronic device (e.g., desktop computer and laptop computer), such that the host electronic device can transmit data to or receive data from an external electronic device through the USB connector.

However, it is experienced that short-distance communication USB interface is not suitable for application in the industrial control needing long distance data transmission. Even though Ethernet interface or wireless network interface are both able to conduct long distance data transmission instead of the USB interface, they both have the principal shortcoming of expensive price. For above reasons, an USB to UART converter is developed by USB device manufactures, and the USB to UART converter is also called USB-UART bridge. FIG. 1 and FIG. 2 illustrate a first and a second stereo diagram of a conventional USB to UART converter, respectively. As FIG. 1 and FIG. 2 show, the conventional USB to UART converter 1a comprises: a USB interface 11a for being electrically connected to a host computer 2a, a UART interface 12a and a bridge chip 10a, in which the UART interface 12a is a RS232 connector as shown in FIG. 2. Nowadays, famous commercial bridge chips include chip FTDI-232 and chip PL-2303 they are developed by Future Technology Devices International (FTDI) Ltd. and Prolific Technology Inc.

In some industrial control applications, for ensuring data accuracy, data monitoring is needed to be conducted for the data in transmission. Accordingly, China patent No. CN101101567B discloses a monitoring system having two serial communication interfaces (ports) as shown in FIG. 3, and the monitoring system 1b comprises: a first USB-RS232 converter 11b, a second USB-RS232 converter 12b, a USB hub chip 13b, and a host computer 10b. When making a first electronic device 2b be able to transmit data to and/or receive data from a second electronic device 3b, a data transmitting (Tx) terminal of a first RS232 interface 21b of the first electronic device 2b is coupled to a data receiving (Rx) terminal of a second RS232 interface 31b of the second electronic device 3b, and a data receiving terminal of the first RS232 interface 21b is coupled to a data transmitting terminal of the second RS232.

As FIG. 3 shows, the first USB-RS232 converter 11b is coupled to a first data transmission path formed between the Tx terminal of the first RS232 interface 21b and the Rx terminal of the second RS232 interface 31b, and the second USB-RS232 converter 12b is coupled to a second data transmission path formed between the Rx terminal of the first RS232 interface 21b and the Tx terminal of the second RS232 interface 31b. By such arrangements, the first USB-RS232 converter 11b receives a first serial data from the first data transmission path, and then converts the first serial data to a first USB data, thereby transmitting the first USB data to the host computer 10b. On the other hand, the second USB-RS232 converter 12b receives a second serial data from the second data transmission path, and then converts the second serial data to a second USB data, thereby transmitting the second USB data to the host computer 10b.

Therefore, the monitoring system 1b disclosed by China patent No. CN101101567B is indeed able to monitor the transmission data between the first electronic device 2b and the second electronic device 3b. In spite of the foregoing fact, practical experiences still reveal that the monitoring system 1b has the principal shortcoming of: in case of the Baud rate of the first serial data transmitted in the first data transmission path being unknown, given values of the first USB data converted from the first serial data may be not correct or not inconsistent.

According to above descriptions, it is understood that there is still room for improvement in the conventional monitoring system having two serial communication interfaces. In view of this fact, inventors of the present application have made great efforts to make inventive research and eventually provided a bridge device having data monitoring function and a USB to UART converter using the bridge device.

SUMMARY OF THE INVENTION

The primary objective of the present invention is to disclose a bridge device with data monitoring function, which can be presented by a form of integrated circuit (IC) chip, and is then disposed on a circuit board with a USB connector and a UART connector, thereby forming a USB to UART converter. When using the USB to UART converter, the USB connector is connected to a host electronic device, and the UART connector is connected to an electronic device. As such, the bridge device provides the host electronic device with at least three virtual COM ports, such that the host electronic device is able to conduct a data transmission with the electronic device through one virtual COM port. Moreover, during the data transmission, the host electronic device is also able to hear the transmitted data by way of diverting the transmitted data through the other two virtual COM ports.

Most importantly, during the host electronic device conducting a data transmission with an external electronic device through the USB to UART converter, the bridge device of the present invention makes the host electronic device be able to correctly hear the data in transmission without needing synchronizing the Baud rate of the UART connector, and the host electronic device is also able to apply a data amending process to the transmitted data in case of not destructing the accuracy of the transmitted data. The reason is that the heard data is acquired after the transmitted data is decoded, and the data amending process is conducted before the data transmission. As explained in detail below, the data monitoring and the data amendment are both conducted in the bridge device instead of the UART connector, such that it does not need to synchronize the Baud rate as conducting the data monitoring or the data amendment. In addition, the bridge device of the present invention further provides the host electronic device to change the Baud rate of the UART connector.

On the other hand, in case of the host electronic device utilizing one virtual COM port to transmit a first data to or receive a second data from the electronic device, the host electronic device is able to incorporate an additional data into the first data or the second data through at least one of the other two virtual COM ports.

For achieving the primary objective mentioned above, the present invention provides an embodiment of the bridge device, comprising:
- a USB unit for being electrically connected to a USB interface;
- a UART unit for being electrically connected to a UART interface;
- a plurality of interface units, comprising a first interface unit, a second interface unit and a third interface unit all coupled to the USB unit;
- a plurality of data buffer units, comprising a first data buffer unit coupled to the second interface unit, a second data buffer unit coupled to the first interface unit, and a third data buffer unit coupled to the third interface unit;
- a data diverting unit, being coupled to the first data buffer unit, the second data buffer unit and the third data buffer unit;
- a FIFO unit, being coupled between the data diverting unit and the UART unit, and comprising a control buffer; and
- a control endpoint (EP0), being coupled to the control buffer;
- wherein the USB unit communicates with a host electronic device through the USB interface, and the UART unit communicating with an electronic device through the UART interface;
- wherein in case of the electronic device transmitting a first serial data to the UART interface, the UART unit receiving the first serial data through the UART interface by a first Baud rate, and then the first serial data is transmitted to the second data buffer unit and the third data buffer unit through the FIFO unit and the data diverting unit, such that the USB unit is able to receive the first serial data through the first interface unit and the third interface unit;
- wherein in case of the host electronic device transmitting a first USB data to the USB interface, the USB unit receiving the first USB data through the USB interface and subsequently temporarily storing the first USB data in the second data buffer unit, and then the data diverting unit transmits the first USB data to the FIFO unit after acquiring the first USB data by reading the second data buffer unit, such that the UART unit is able to receive the first USB data from the FIFO unit;
- wherein the second data buffer unit diverts the first USB data to the first data buffer unit before transmitting the first USB data to the data diverting unit, such that the USB unit is able to receive the first USB data from the second interface unit.

In one embodiment, during the electronic device transmitting the first serial data to the host electronic device via said bridge device, the host electronic device is able to transmit an additional data to the USB unit, such that the data diverting unit cooperates with the third data buffer unit and the third interface unit so as to incorporate the additional data into the first serial data.

In one embodiment, during the host electronic device transmitting the first USB data to the electronic device via said bridge device, the host electronic device is able to transmit an additional data to the USB unit, such that the data diverting unit cooperates with the first data buffer unit and the second interface unit so as to incorporate the additional data into the first USB data.

In one embodiment, said bridge device is presented by a form of integrated circuit (IC) chip, complex programmable logic device (CPLD) chip or field programmable gate array (FPGA) chip.

In one embodiment, the USB interface comprises a first USB connector, the UART interface comprises a first UART connector, and the first UART connector is one selected from a group consisting of RS232 connector, RS422 connector and RS485 connector.

In one practicable embodiment, said bridge device further comprises:
- a memory, being electrically connected to the control buffer;
- a GPIO unit, being electrically connected to the control buffer, and comprising at least one GPIO pin for being coupled to the electronic device.

In one embodiment, the FIFO unit comprises:
- said control buffer, being coupled to the control endpoint (EP0), the memory and the GPIO unit;
- a first FIFO (Bulk OUT FIFO), being coupled to the data diverting unit and the UART unit;
- a second FIFO (Bulk IN FIFO), being coupled to the data diverting unit and the UART unit; and
- a third FIFO (Interrupt FIFO), being coupled to the UART unit, the first data buffer unit, the second data buffer unit, and the third data buffer unit.

In one embodiment, the USB unit comprises:
- a USB physical layer (PHY) unit, being coupled to the USB interface; and
- a USB serial interface engine (SIE) unit, being coupled to the USB PHY unit, the control endpoint (EP0), the first interface unit, the second interface unit and the third interface unit.

In one embodiment, the UART unit comprises:
- a controller, being coupled to the third FIFO (Interrupt FIFO) and the UART interface;
- a data transmitting buffer, being coupled to the controller and the first FIFO (Bulk OUT FIFO); and
- a data receiving buffer, being coupled to the controller and the second FIFO (Bulk IN FIFO).

In one embodiment, the data diverting unit comprises:
- a first multiplexer, having a first input terminal, a second terminal and an output terminal, wherein the first input terminal is coupled to the first data buffer unit, the second input terminal being coupled to the second data buffer unit, and the output terminal being coupled to the first FIFO; and
- a second multiplexer, also having a first input terminal, a second terminal and an output terminal, wherein the output terminal is coupled to the second data buffer unit, the first input terminal being coupled to the second FIFO, and the second input terminal being coupled to the third data buffer unit;
- wherein the first data buffer unit is also coupled between the second input terminal of the first multiplexer and the second data buffer unit.

In one embodiment, the first data buffer unit comprises:
- a first buffer, being coupled to the second interface unit and the third FIFO;
- a second buffer, being coupled to the second interface unit and the first input terminal of the first multiplexer; and a third buffer, being coupled to the second interface unit, and being also coupled between the second data buffer unit and the second input terminal of the first multiplexer.

In one embodiment, the second data buffer unit comprises:
a fourth buffer, being coupled to the first interface unit, the second input terminal of the first multiplexer and the third buffer;
a fifth buffer, being coupled to the first interface unit and the third FIFO; and
a sixth buffer, being coupled to the first interface unit and the output terminal of the second multiplexer.

In one embodiment, the third data buffer unit comprises:
a seventh buffer, being coupled to the third interface unit and the second input terminal of the second multiplexer;
an eighth buffer, being coupled to the third interface unit, and being also coupled between the second FIFO and the first input terminal of the second multiplexer; and
a ninth buffer, being coupled to the third interface unit and the third FIFO.

In one embodiment, the first interface unit comprises:
a first endpoint, being coupled to the USB unit and the fifth buffer;
a second endpoint, being coupled to the USB unit and the fourth buffer; and a third endpoint, being coupled to the USB unit and the six buffer.

In one embodiment, the second interface unit comprises:
a fourth endpoint, being coupled to the USB unit and the first buffer;
a fifth endpoint, being coupled to the USB unit and the second buffer; and
a sixth endpoint, being coupled to the USB unit and the third buffer.

In one embodiment, the third interface unit comprises:
a seventh endpoint, being coupled to the USB unit and the ninth buffer;
an eighth endpoint, being coupled to the USB unit and the seventh buffer; and
a ninth endpoint, being coupled to the USB unit and the seventh buffer.

In a practicable embodiment, the host electronic device is one selected from a group consisting of laptop computer, desktop computer, all-in-one computer, industrial computer, and server computer.

Moreover, the present invention also provides an embodiment of a USB to UART converter, which comprises a printed circuit board, a USB connector, a UART connector and a bridge device, wherein the USB connector, the UART connector and the bridge device are all disposed on the printed circuit board, and the bridge device being electrically connected to the USB connector and the UART connector; characterized in that the ridge device comprises:
a USB unit for being electrically connected to a USB interface;
a UART unit for being electrically connected to a UART interface;
a plurality of interface units, comprising a first interface unit, a second interface unit and a third interface unit all coupled to the USB unit;
a plurality of data buffer units, comprising a first data buffer unit coupled to the second interface unit, a second data buffer unit coupled to the first interface unit, and a third data buffer unit coupled to the third interface unit;
a data diverting unit, being coupled to the first data buffer unit, the second data buffer unit and the third data buffer unit;
a FIFO unit, being coupled between the data diverting unit and the UART unit, and comprising a control buffer; and
a control endpoint (EP0), being coupled to the control buffer;
wherein the USB unit communicates with a host electronic device through the USB interface, and the UART unit communicating with an electronic device through the UART interface;
wherein in case of the electronic device transmitting a first serial data to the UART interface, the UART unit receiving the first serial data through the UART interface by a first Baud rate, and then the first serial data is transmitted to the second data buffer unit and the third data buffer unit through the FIFO unit and the data diverting unit, such that the USB unit is able to receive the first serial data through the first interface unit and the third interface unit;
wherein in case of the host electronic device transmitting a first USB data to the USB interface, the USB unit receiving the first USB data through the USB interface and subsequently temporarily storing the first USB data in the second data buffer unit, and then the data diverting unit transmits the first USB data to the FIFO unit after acquiring the first USB data by reading the second data buffer unit, such that the UART unit is able to receive the first USB data from the FIFO unit;
wherein the second data buffer unit diverts the first USB data to the first data buffer unit before transmitting the first USB data to the data diverting unit, such that the USB unit is able to receive the first USB data from the second interface unit.

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE PREFERRED EMBODIMENTS

To more clearly describe a bridge device having data monitoring function and a USB to UART converter according to the present invention, embodiments of the present invention will be described in detail with reference to the attached drawings hereinafter.

Figure 1:
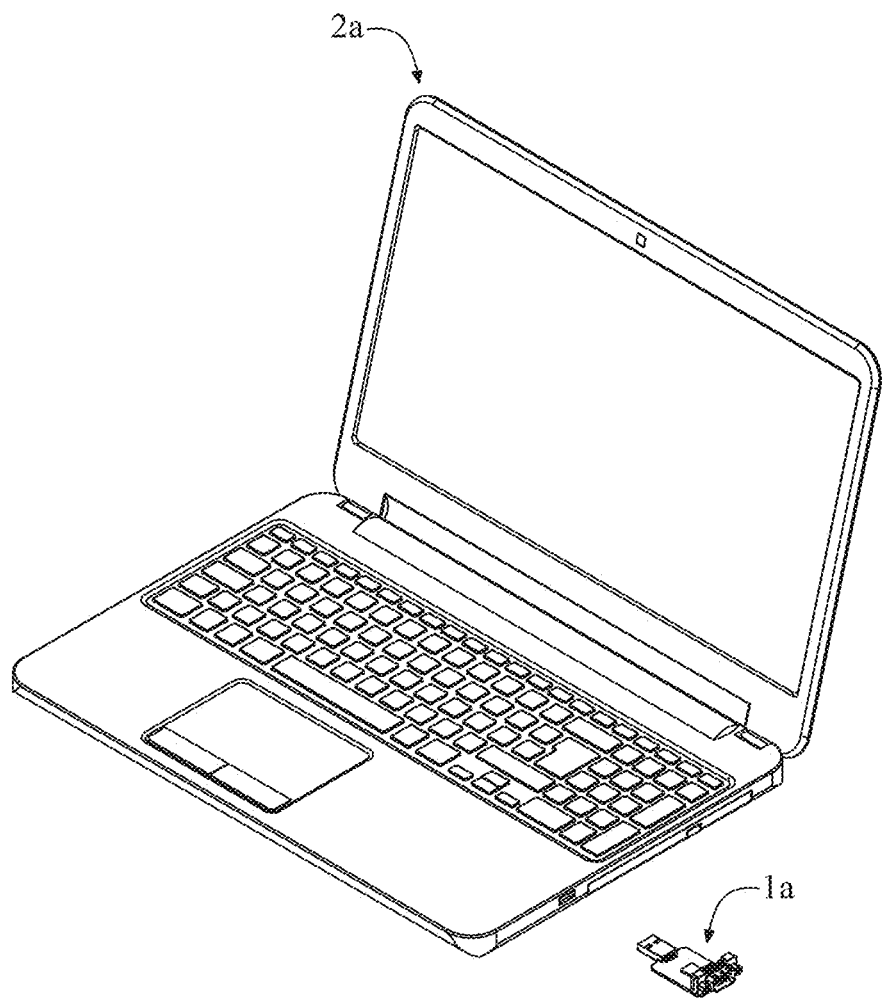
FIG. 1 shows a first stereo diagram of a conventional USB to UART converter.
Figure 2:
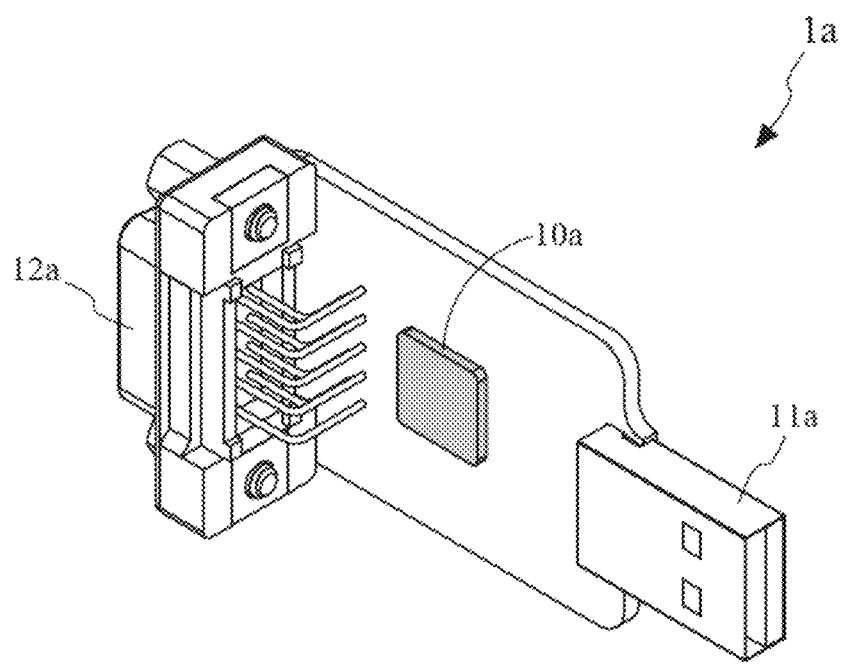
FIG. 2 shows a second stereo diagram of the conventional USB to UART converter.
Figure 3:
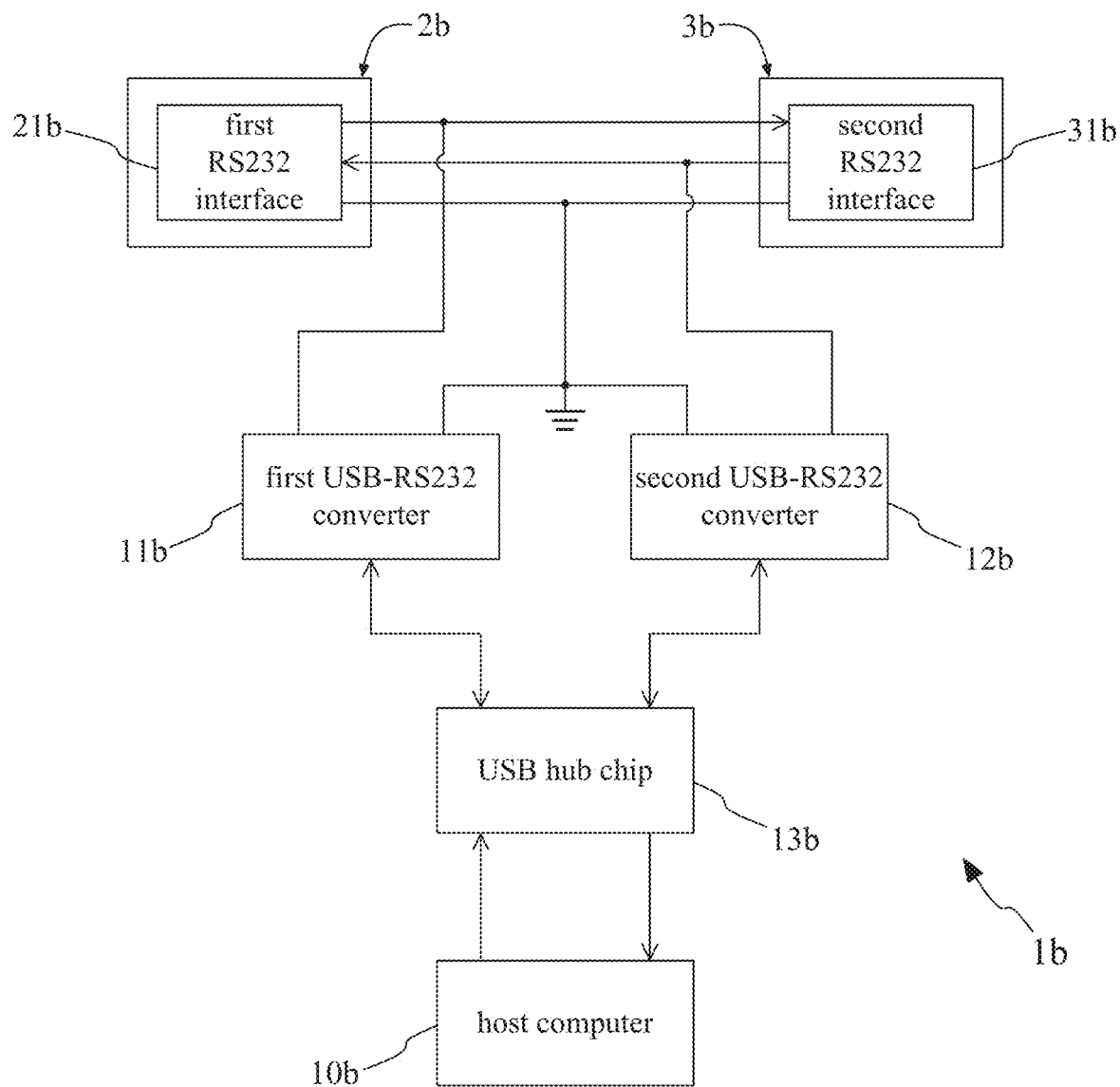
FIG. 3 shows a block diagram of a monitoring system having two serial communication interfaces (ports)
Figure 4:
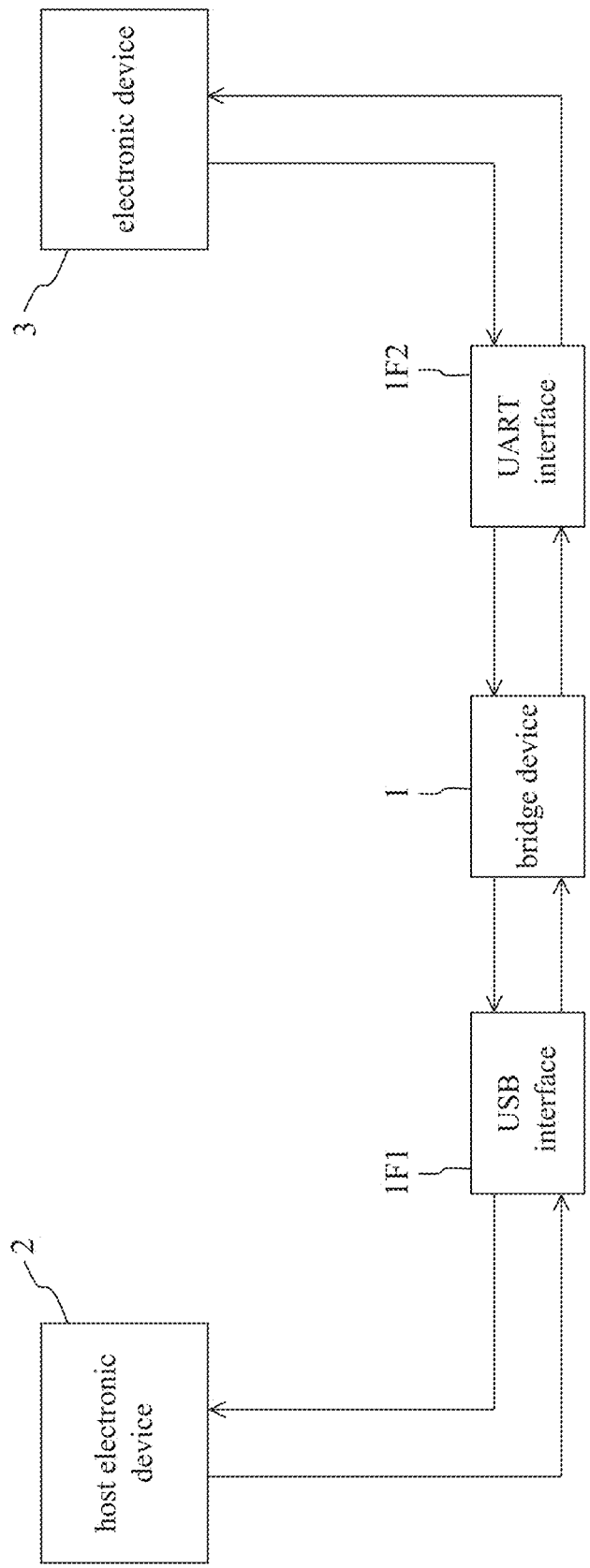
FIG. 4 shows a block diagram of a bridge device having data monitoring function according to the present invention.
Figure 5:
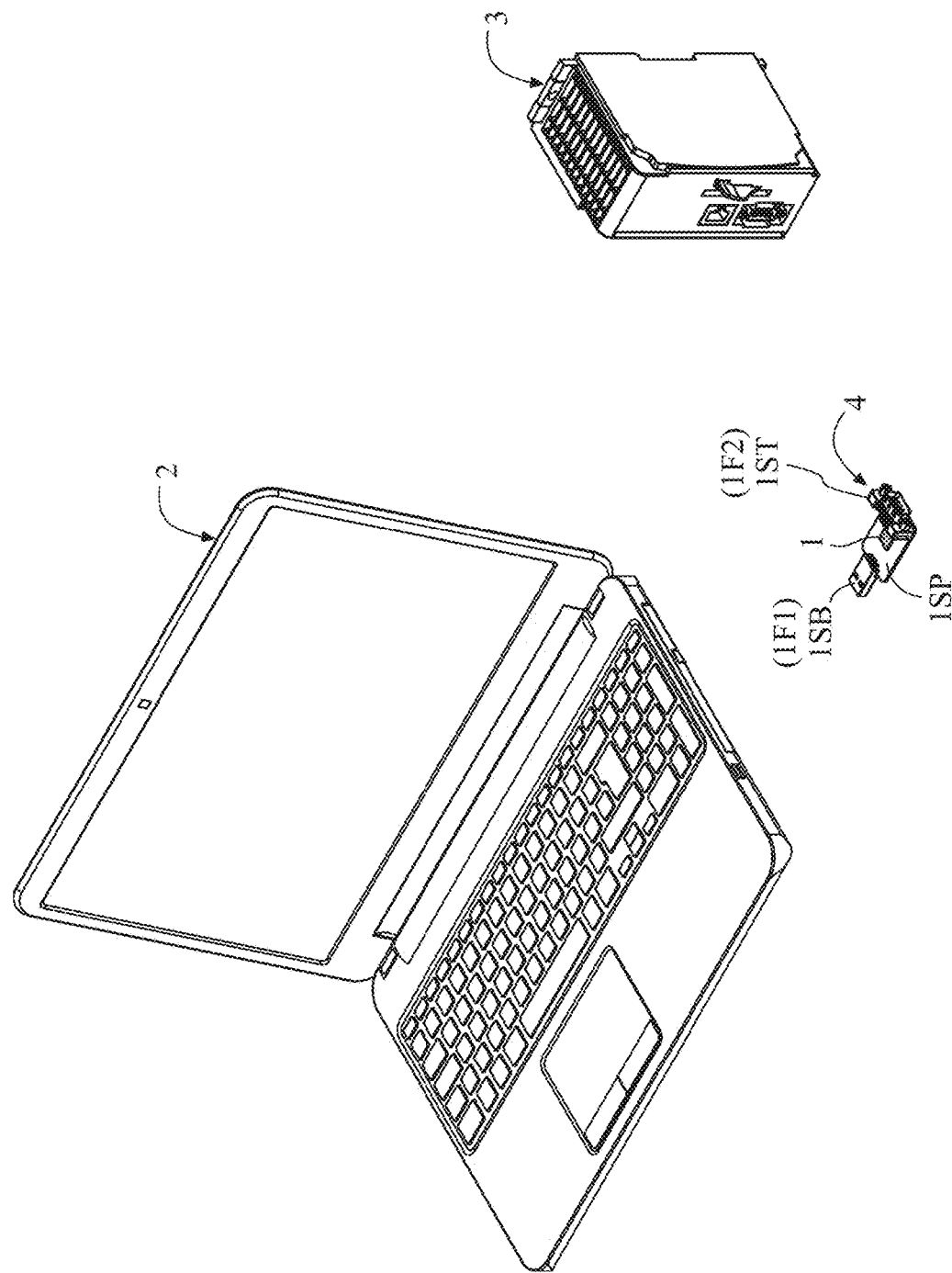
FIG. 5 shows a stereo diagram of a host electronic device, an electronic device, and the bridge device having data monitoring function according to the present invention.

With reference to FIG. 4, which illustrates a block diagram of a bridge device having data monitoring function according to the present invention. As FIG. 4 shows, the present invention provides a bridge device 1, which can be electrically connected to a USB interface 1F1 and a UART interface 1F2, such that the bridge device 1 communicates with a host electronic device 2 through the USB interface 1F1, and communicates with an electronic device 3 via the UART interface 1F2. In addition, FIG. 5 depicts a stereo diagram of the host electronic device 2, the electronic device 3, and the bridge device 1 according to the present invention. As FIG. 4 and FIG. 5 show, the USB interface 1F1 comprises a first USB connector 1SB for being connected to a second USB connector of the host electronic device 2, and the UART interface 1F1 comprises a first UART connector 1ST for being connected to a second UART connector of the electronic device 3. Moreover, according to FIG. 5, it is understood that the bridge device 1 can be presented by a form of integrated circuit (IC) chip, and is then disposed on a circuit board 1SP with the USB connector 1SB and the UART connector 1ST, thereby forming a USB to UART converter 4.

In other practicable embodiments, the bridge device 1 can also be presented by a form of complex programmable logic device (CPLD) chip or field programmable gate array (FPGA) chip, wherein the CPLD chip or the FPGF chip is embedded with HDL (hardware description language) codes for establishing the circuitry of the bridge device 1. On the other hand, the first UART connector 1ST can be, but not limited to, a RS232 connector, a RS422 connector or a RS485 connector. Moreover, the host electronic device 2 can be, but not limited to, a laptop computer, a desktop computer, an all-in-one computer, an industrial computer, or a server computer.

Figure 6:
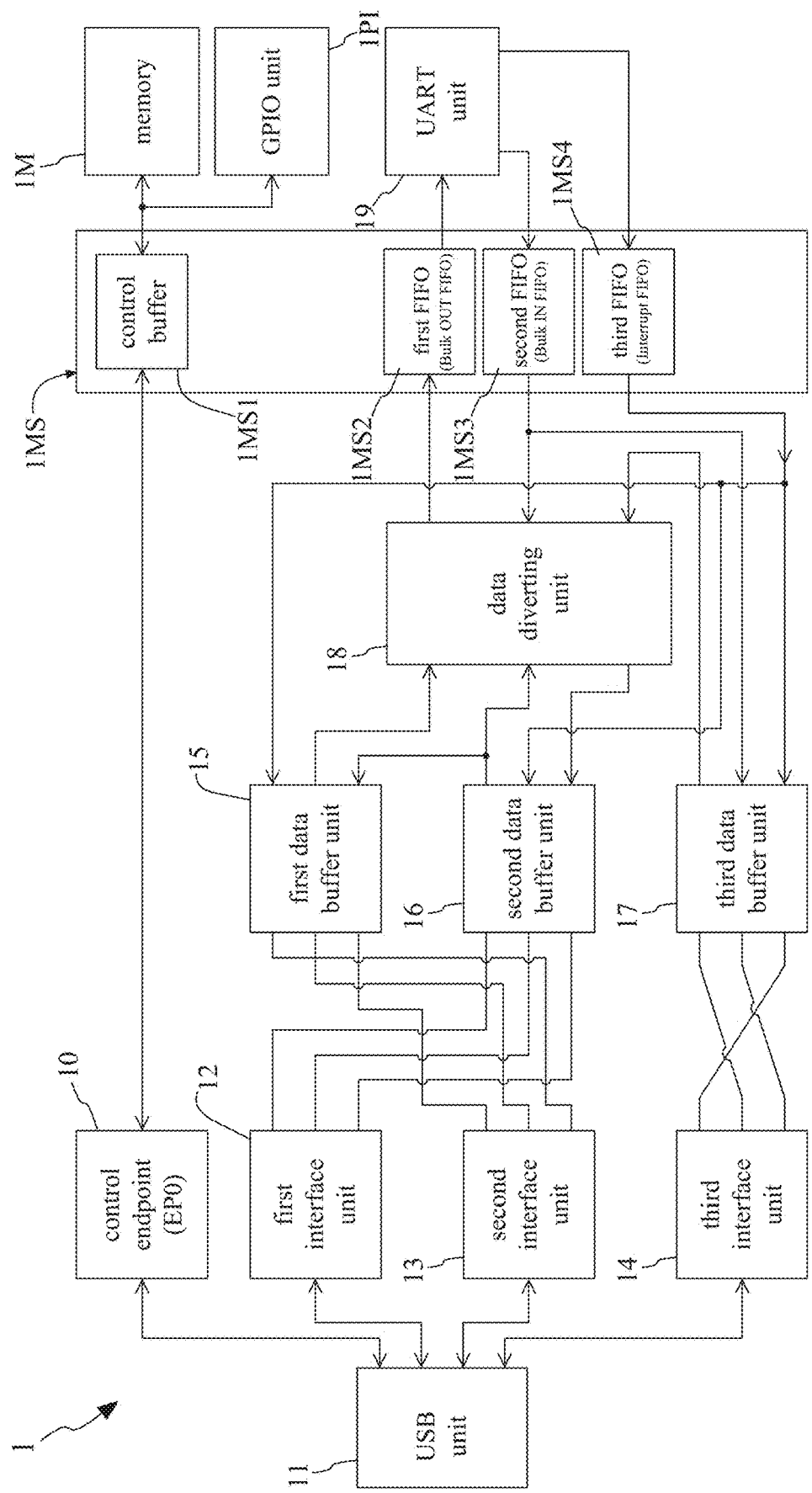
FIG. 6 shows a block diagram of the bridge device as shown in FIG. 5.

FIG. 6 illustrates a block diagram of the bridge device as shown in FIG. 5. As FIG. 5 and FIG. 6 show, the bridge device 1 principally comprises: a USB unit 11, a UART unit 19, at least three interface units (12, 13, 14), at least three data buffer units (15, 16, 17), a data diverting unit 18, a FIFO unit 1MS, a control endpoint (EP0) 10, a memory 1M, and a GPIO unit 1PI. According to the present invention, the USB unit 11 communicates with the host electronic device 2 through the USB interface 1F1, and the UART unit 19 communicates with the electronic device 3 through the UART interface 1F2.

As FIG. 5 and FIG. 6 show, the control endpoint (EP0) 10 and the three interface units (12, 13, 14) are all coupled to the USB unit 11. Electronic engineers skilled in design and manufacture of USB devices certainly know that, a regular USB device must be provided with at least three standard endpoints therein, i.e., EP0, EP_IN and EP_OUT, in which EP0 is responsible for enumerating configuration descriptors and configurating control transfer (e.g., read transaction or write transaction), EP_OUT (i.e., EP1) is used for transmitting a data from a host end (e.g., the host electronic device 2) to a device end (e.g., the electronic device 3), and EP_IN (i.e., EP2) is adopted for transmitting a data from the device end to the host end. Moreover, in the regular USB device, EP1 and EP2 can also be defined as EP_IN and EP_OUT through endpoint declaration. However, differing from the regular USB device, the three interface units (12, 13, 14) all comprise three endpoints, wherein one endpoint is responsible for transmitting a data from a host end (e.g., the host electronic device 2) to a device end (e.g., the electronic device 3), and the other two endpoints are both used for transmitting a data from the device end to the host end. As described in more detail below, since there are three interface units (12, 13, 14) provided in the ridge device 1, device manager of the host electronic device's operating system would detect so as to enumerate three virtual COM ports in the device tree after the USB unit 11 of the bridge device 1 is in communication with the USB interface 1F1 that is electrically connected to the host electronic device 2. As a result, the host electronic device 2 is able to conduct a data transmission with the electronic device 3 through one virtual COM port. Moreover, during the data transmission, the host electronic device 2 is also able to hear the transmitted data by way of diverting the transmitted data through the other two virtual COM ports, so as to ensure the accuracy of the data transmitted between the host electronic device 2 and the electronic device 3.

Figure 7:
FIG. 7 shows a first image of a device manager of an operating system of the host electronic device.

It is worth further explaining that, standard CDC-ACM driver can be taken as a main driver program stored in the memory 1M of the bridge device 1. As FIG. 6 and FIG. 7 show, in case of the main driver program stored in the memory 1M being the standard CDC-ACM driver, device manager of the host electronic device's operating system would detect so as to enumerate three virtual COM ports in the device tree after the bridge device 1 is in communication with the host electronic device 2. Therefore, the host electronic device 2 is able to conduct a data transmission with the electronic device 3 through one virtual COM port. Moreover, during the data transmission, the host electronic device 2 is also able to hear the transmitted data by way of diverting the transmitted data through the other two virtual COM ports, so as to ensure the accuracy of the data transmitted between the host electronic device 2 and the electronic device 3.

Figure 8:
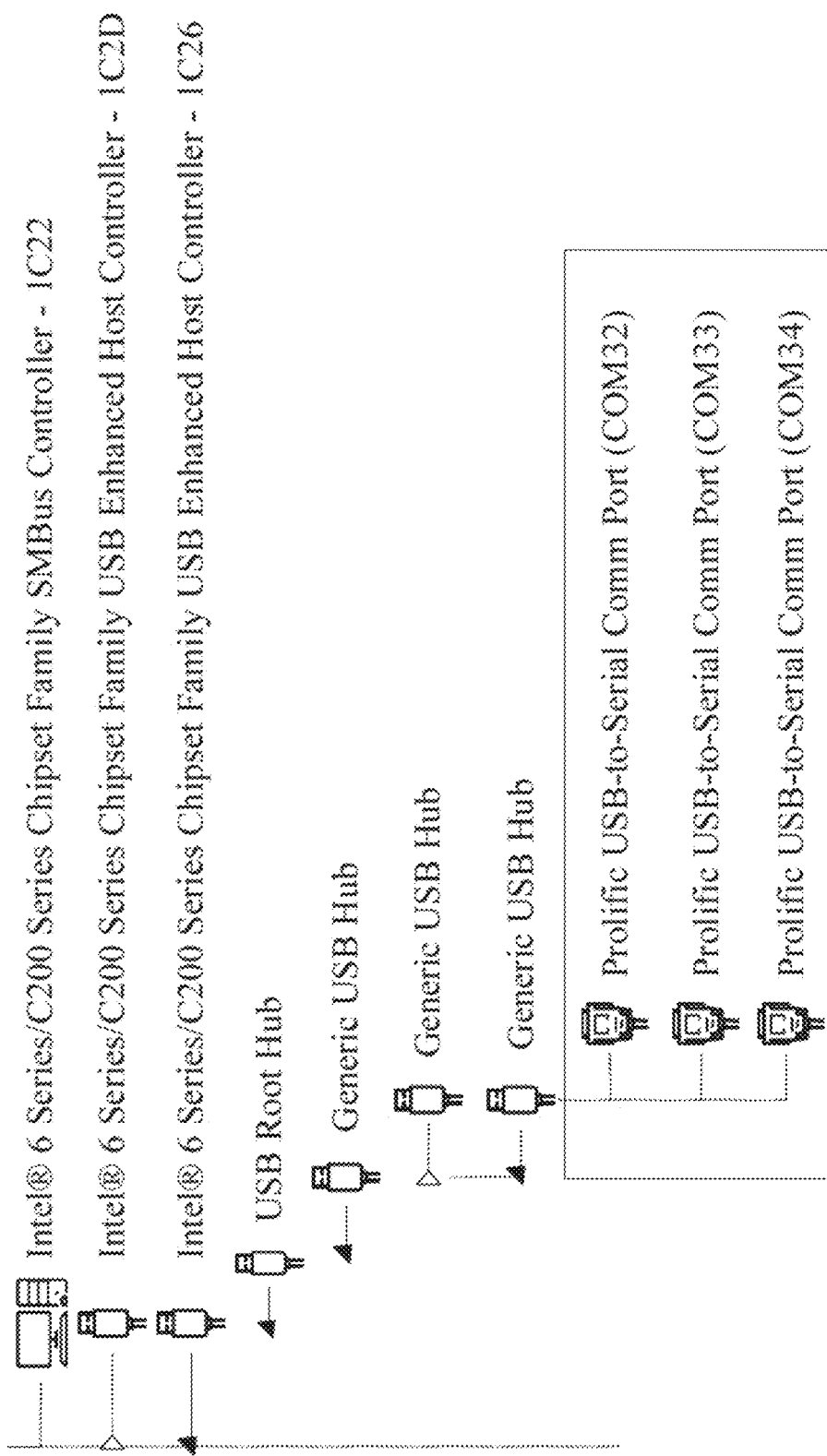
FIG. 8 shows a second image of the device manager the host electronic device.
Figure 9:
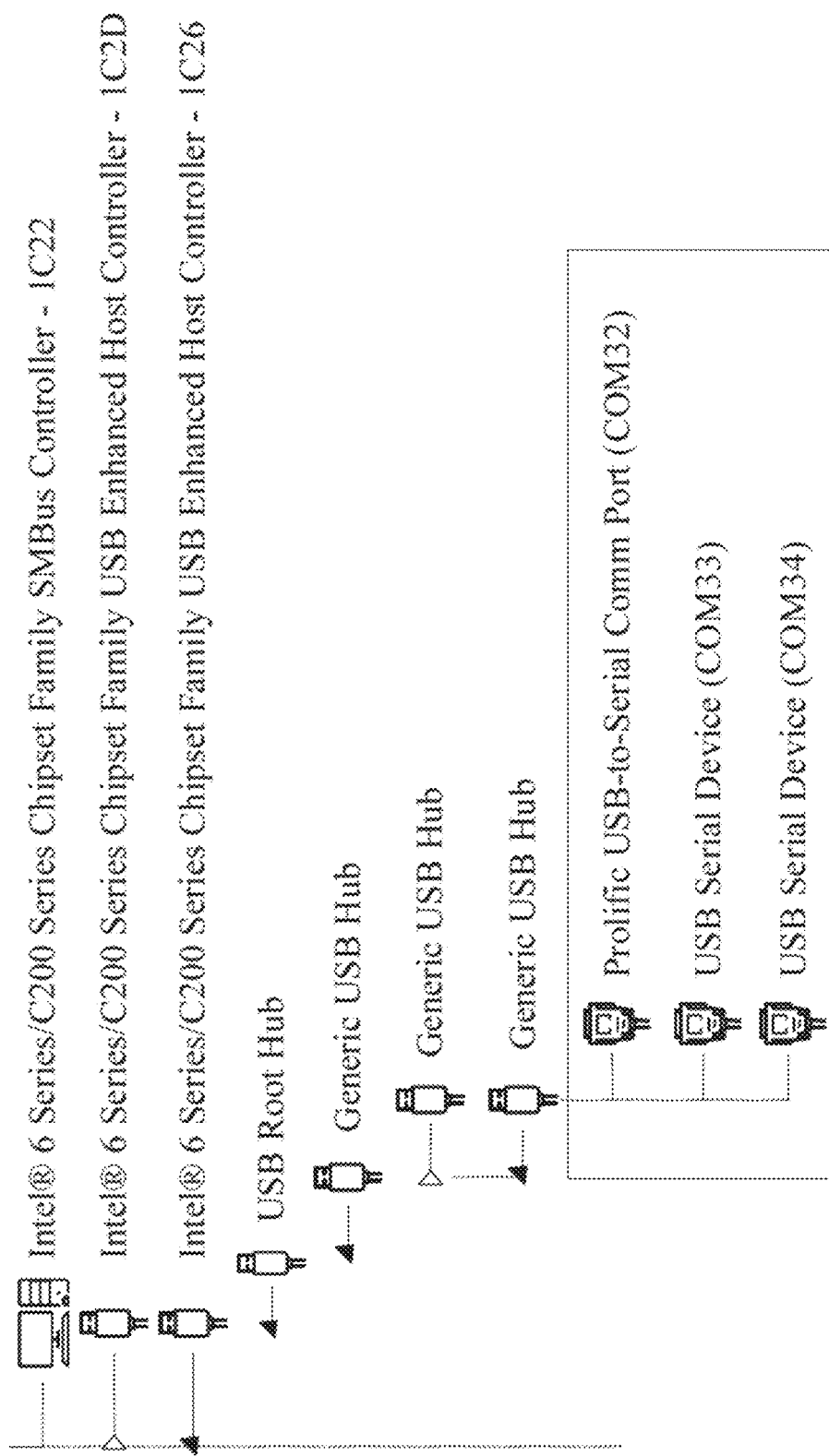
FIG. 9 shows a third image of the device manager the host electronic device.

In other practicable embodiments, the main driver program stored in the memory 1M can also be made by a programmer or a software engineer. In other words, the main driver program is not the standard CDC-ACM driver. As FIG. 8 shows, in case of the programmer creating a driver program to be stored in the memory of the bridge device 1, device manager of the host electronic device's operating system would still detect so as to enumerate three virtual COM ports in the device tree after the bridge device 1 is in communication with the host electronic device 2. It is noted that, in FIG. 7 the three virtual COM ports all have the same device name "USB Serial Device", a standard USB device name given by the standard CDC-ACM driver. On the contrary, in FIG. 8 the three virtual COM ports all have the same engineer-given device name "Prolific USB-to-Serial Comm Port". In addition, a specific driver program can be produced by revising the standard CDC-ACM driver, thereby being stored in the memory 1M. As FIG. 9 shows, in case of the specific driver program being stored in the memory of the bridge device 1, device manager of the host electronic device's operating system would still detect so as to enumerate three virtual COM ports in the device tree after the bridge device 1 is in communication with the host electronic device 2. In FIG. 9, two of the three virtual COM ports are both named "USB Serial Device", and the other virtual COM port has an engineer-given device name "Prolific USB-to-Serial Comm Port".

Figure 10:
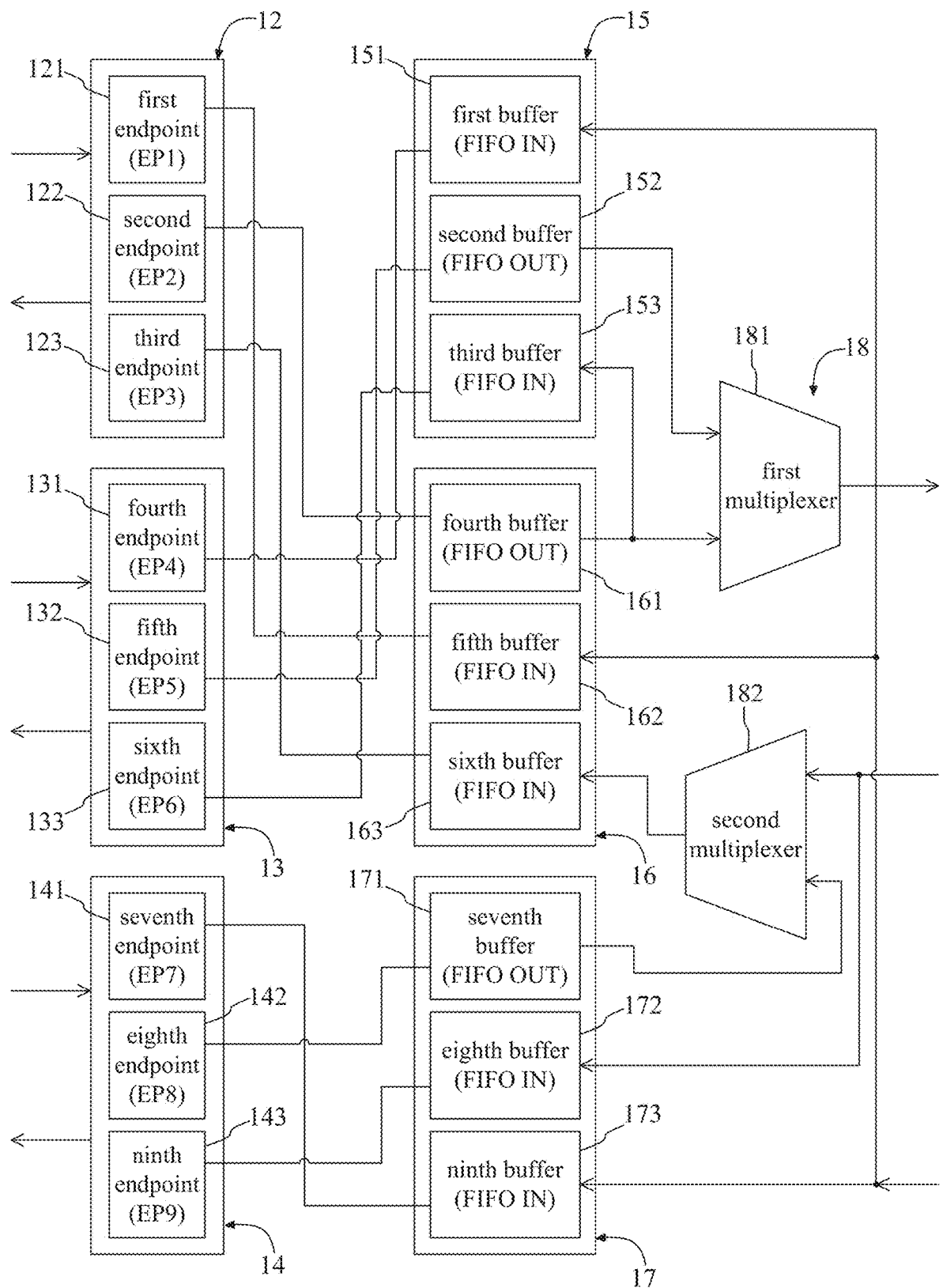
FIG. 10 shows a block diagram of a data diverting unit, a first interface unit, a second interface unit, a third interface unit, a first data buffer unit, a second data buffer unit, and a third data buffer unit as shown in FIG. 6.

FIG. 10 illustrates a block diagram of a data diverting unit 18, a first interface unit 12, a second interface unit 13, a third interface unit 14, a first data buffer unit 15, a second data buffer unit 16, and a third data buffer unit 17 they are shown in FIG. 6. According to FIG. 6 and FIG. 10, the three interface units (12, 13, 14) are the first interface unit 12, the second interface unit 13 and the third interface unit 14 they are all coupled to the USB unit 11, in which the first interface unit 12 comprises a first endpoint 121, a second endpoint 122 and a third endpoint 123, the second interface unit 13 comprises a fourth endpoint 131, a fifth endpoint 132 and a sixth endpoint 133, and the third interface unit 14 comprises a seventh endpoint 141, an eighth endpoint 142 and a ninth endpoint 143.

Moreover, the three data buffer units (15, 16, 17) are the first buffer unit 15 coupled to the second interface unit 13, the second buffer unit 16 coupled to the first interface unit 12, and the third buffer unit 17 coupled to the third interface unit 14, wherein the first buffer unit 15 comprises a first buffer (FIFO IN) 151, a second buffer (FIFO OUT) 152 and a third buffer (FIFO IN) 153. Engineer skilled in design and manufacture of USB devices certainly know that, FIFO IN and FIFO OUT are two inverse types of data buffer with feature of unidirectional data transmission. For example, the fifth endpoint 132 is defined as EP_OUT, so as to be used for transmitting a data from the host electronic device (i.e., the host end) to the electronic device 3 (i.e., the device end) through the second buffer (FIFO OUT) 152 and the data diverting unit 18. To take another one example, the fourth endpoint 131 is defined as EP_IN, such that the fourth endpoint 131 is able to receive a data from the UART unit 19 through the first buffer (FIFO IN) 151 and the data diverting unit 18. To take further one example, the sixth endpoint 132 is also defined as EP_IN, and then is able to receive a data from the UART unit 19 through the third buffer (FIFO IN) 153 and the data diverting unit 18.

As FIG. 10 shows, the second buffer unit 16 comprises a fourth buffer (FIFO OUT) 161, a fifth buffer (FIFO IN) 162 and a sixth buffer (FIFO IN) 163. According to the present invention, the first endpoint 121 is defined as EP_IN, so as to be used for receiving a data receive a data from the UART unit 19 through the fifth buffer (FIFO IN) 162 and the data diverting unit 18. On the other hand, the second endpoint 122 is defined as EP_OUT, so as to be used for transmitting a data from the host electronic device 2 to the electronic device 3 through the fourth buffer (FIFO OUT) 161 and the data diverting unit 18. Moreover, the third endpoint 123 is defined as EP_IN, so as to be used for receiving a data receive a data from the UART unit 19 through the sixth buffer (FIFO IN) 163 and the data diverting unit 18.

In addition, FIG. 10 depicts that the third buffer unit 17 comprises a seventh buffer 171 (FIFO OUT), an eighth buffer 172 (FIFO IN) and a ninth buffer 173 (FIFO IN). According to the present invention, the seventh endpoint 141 is defined as EP_IN, so as to be used for receiving a data receive a data from the UART unit 19 through the fi ninth buffer 173 (FIFO IN) and the data diverting unit 18. On the other hand, the eighth endpoint 142 is defined as EP_OUT, so as to be used for transmitting a data from the host electronic device 2 to the electronic device 3 through the seventh buffer (FIFO OUT) 171 and the data diverting unit 18. Moreover, the ninth endpoint 143 is defined as EP_IN, so as to be used for receiving a data receive a data from the UART unit 19 through the eighth buffer (FIFO IN) 172 and the data diverting unit 18.

As FIG. 6 and FIG. 10 show, the data diverting unit 18 is coupled to the first data buffer unit 15, the second data buffer unit 16 and the third data buffer unit 17, and comprises a first multiplexer 181 and a second multiplexer 182. On the other hand, the FIFO unit 1MS is coupled between the data diverting unit 18 and the UART unit 19, and comprises a control buffer 1MS1, a first FIFO (Bulk OUT FIFO) 1MS2, a second FIFO (Bulk IN FIFO) 1MS3, and a third FIFO (Interrupt FIFO) 1MS4. As described in more detail below, the first multiplexer 181 has a first input terminal, a second terminal and an output terminal, wherein the first input terminal is coupled to the first data buffer unit 15, the second input terminal is coupled to the second data buffer unit 16, and the output terminal is coupled to a first FIFO (Bulk OUT FIFO) 1MS2.

On the other hand, the second multiplexer 182 also has a first input terminal, a second terminal and an output terminal, in which the output terminal is coupled to the second data buffer unit 16, the first input terminal is coupled to the second FIFO (Bulk IN FIFO) 1MS3, and the second input terminal is coupled to the third data buffer unit 17. Moreover, in FIG. 10 the first data buffer unit 15 is also coupled between the second input terminal of the first multiplexer 181 and the second data buffer unit 16. It needs to further explain that, the control buffer 1MS1 of the FIFO unit 1MS is coupled to the control endpoint (EP0) 10, the memory 1M and the GPIO unit 1PI, and the GPIO unit 1PI comprises at least one GPIO pin for being coupled to the electronic device 3.

Figure 11:
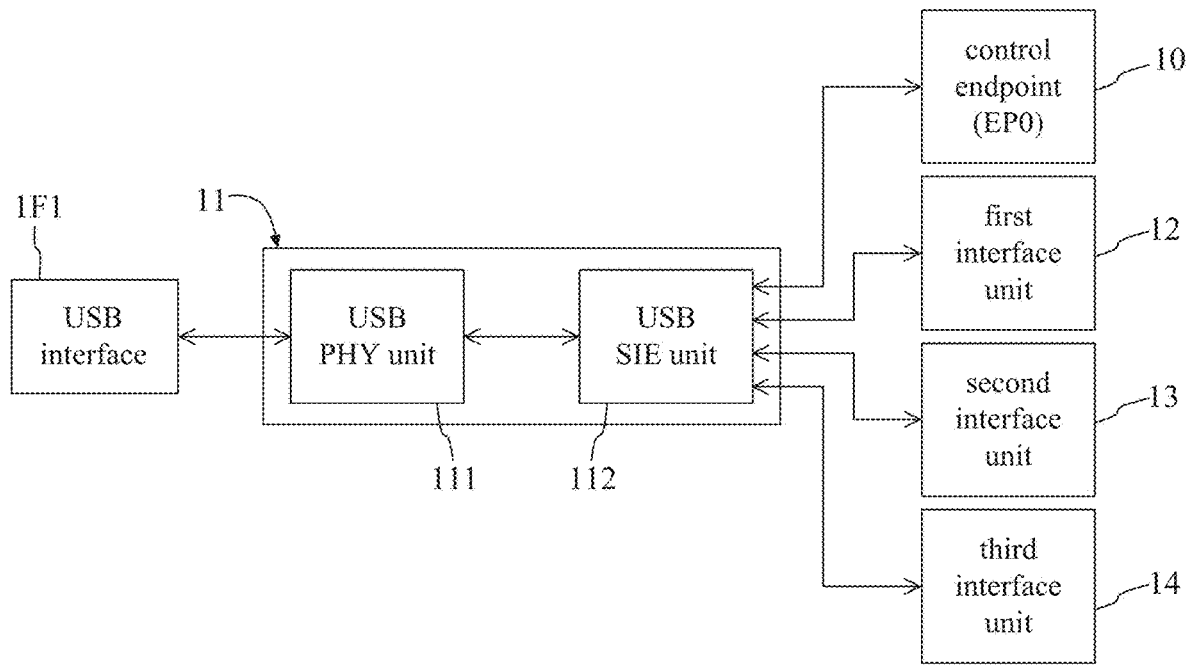
FIG. 11 shows a block diagram of a USB unit as shown in FIG. 6.
Figure 12:
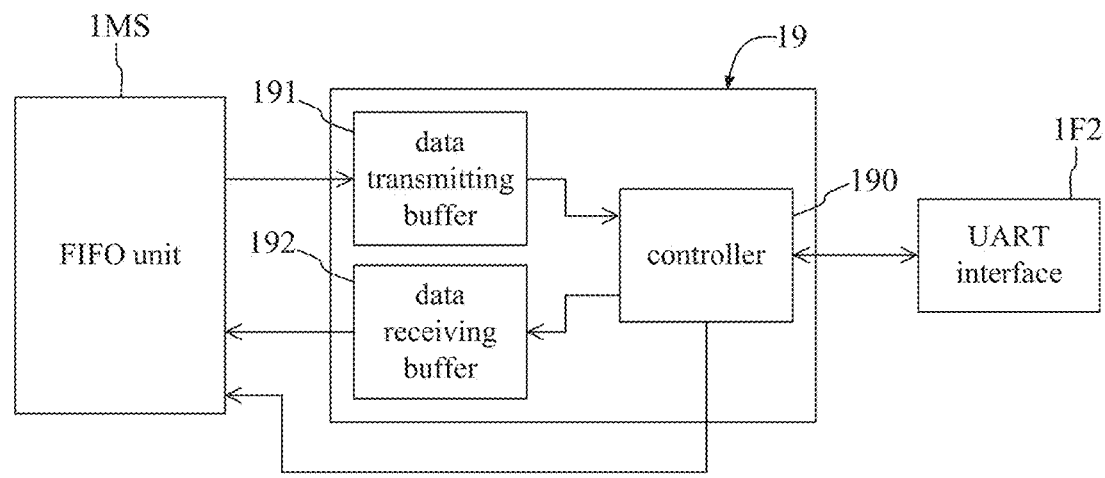
FIG. 12 shows a block diagram of a UART unit as shown in FIG. 6.

FIG. 11 illustrates a block diagram of the USB unit 11 as shown in FIG. 6, and FIG. 12 illustrates a block diagram of the UART unit 19 as shown in FIG. 6. In one embodiment, the USB unit 11 comprises a USB physical layer (PHY) unit 111 coupled to the USB interface 1F1 and a USB serial interface engine (SIE) unit 112, wherein the SIE unit 112 is coupled to the USB PHY unit 111, the control endpoint (EP0) 10, the first interface unit 12, the second interface unit 13 and the third interface unit 14. On the other hand, the UART unit 19 comprises a controller 190 coupled to the third FIFO (Interrupt FIFO) 1MS4 and the UART interface 1F2, a data transmitting buffer 191, and a data receiving buffer 192, wherein the data transmitting buffer 191 is coupled to the controller 190 and the first FIFO 1MS2, and the data receiving buffer 192 is coupled to the controller 190 and the second FIFO 1MS3. Moreover, as FIG. 10, FIG. 11 and FIG. 12 show, the first buffer 151 is also coupled to the third FIFO 1MS4, the second buffer 152 is also coupled to the first input terminal of the first multiplexer 181, and the third buffer 153 is also coupled between the second data buffer unit 16 and the second input terminal of the first multiplexer 181. On the other hand, the fourth buffer 161 is also coupled to the second input terminal of the first multiplexer 181 and the third buffer 153, the fifth buffer 162 is also coupled to the third FIFO 1MS4, and the sixth buffer 163 is also coupled to the output terminal of the second multiplexer 182. Moreover, the seventh buffer 171 is also coupled to the second input terminal of the second multiplexer 182, the eighth buffer 172 is being also coupled between the second FIFO 1MS3 and the first input terminal of the second multiplexer 182, and the ninth buffer 173 is also coupled to the third FIFO 1MS4.

By the particular circuitry design for the bridge device 1, when the electronic device 3 transmits a first serial data to the UART interface 1F2, the UART unit 19 receives the first serial data through the UART interface 1F2 by a first Baud rate, and then the first serial data is transmitted to the sixth buffer (FIFO IN) 163 of the second data buffer unit 16 and the eighth buffer (FIFO IN) 172 of the third data buffer unit 17 through the FIFO unit 1MS and the data diverting unit 18, such that the USB unit 11 is able to receive the first serial data through the third endpoint (EP3) 123 of the first interface unit 12, and also receive the first serial data from the ninth endpoint (EP9) 143 of the third interface unit 14. As such, one virtual COM port is utilized to make the first serial data be transmitted between the electronic device 3 and the host electronic device 2. Moreover, the host electronic device 2 uses another one virtual COM port to hear (monitor) the first serial data in transmission, so as to ensure the accuracy of the first serial data.

According to the present invention, during the electronic device 3 transmitting the first serial data to the host electronic device 2 via said bridge device 1, the host electronic device 2 is able to transmit an additional data to the USB unit 11, such that the additional data is then transmitted from the eighth endpoint (EP8) 142 to the seventh buffer (FIFO OUT) 171, and is further transmitted from the seventh buffer (FIFO OUT) 171 to the data diverting unit 18, thereby being consequently incorporated into the first serial data.

On the other hand, in case of the host electronic device 2 transmitting a first USB data to the USB interface 1F1, the USB unit 11 receives the first USB data through the USB interface 1F1 and subsequently temporarily storing the first USB data in the fourth buffer (FIFO OUT) 161 of the second data buffer unit 16, and then the data diverting unit 18 transmits the first USB data to the FIFO unit 1MS after acquiring the first USB data by reading the fourth buffer (FIFO OUT) 161, such that the UART unit 19 is able to receive the first USB data from the FIFO unit 1MS. It is worth further explaining that, the second data buffer unit 16 diverts the first USB data to the third buffer (FIFO IN) 153 of the first data buffer unit 15 before transmitting the first USB data to the data diverting unit 18, such that the USB unit 11 is able to receive the first USB data from the sixth endpoint (EP6) 133 of the second interface unit 13. As such, one virtual COM port is utilized to make the first USB data be transmitted between the host electronic device 2 and the electronic device 3. Moreover, the host electronic device 2 uses another one virtual COM port to hear (monitor) the first USB data in transmission, so as to ensure the accuracy of the first USB data.

According to the present invention, during the host electronic device 2 transmitting the first USB data to the electronic device 3 via said bridge device 1, the host electronic device 2 is able to transmit an additional data to the USB unit 11, such that the additional data is then transmitted from the fifth endpoint (EP5) 132 to the second buffer (FIFO OUT) 152, and is further transmitted from the second buffer (FIFO OUT) 152 to the data diverting unit 18, thereby being consequently incorporated into the first USB data.

Therefore, through above descriptions, all embodiments and their constituting elements of the bridge device 1 having data monitoring function and the USB to UART converter 4 proposed by the present invention have been introduced completely and clearly. In summary, the present invention includes the advantages of:

(1) the present invention provides a bridge device 1 with data monitoring function, which can be presented by a form of integrated circuit (IC) chip, and is then disposed on a circuit board 1SP with a USB connector 1SB and a UART connector 1ST, thereby forming a USB to UART converter 4. When using the USB to UART converter 4, the USB connector 1SB is connected to a host electronic device 2, and the UART connector 4 is connected to an electronic device 3. As such, the bridge device 1 provides the host electronic device 2 with at least three virtual COM ports, such that the host electronic device 2 is able to conduct a data transmission with the electronic device 3 through one virtual COM port. Moreover, during the data transmission, the host electronic device 2 is also able to hear the transmitted data by way of diverting the transmitted data through the other two virtual COM ports.

(2) Most importantly, during the host electronic device 2 conducting a data transmission with the electronic device 3 through the USB to UART converter 4, the bridge device 1 makes the host electronic device 2 be able to correctly hear the data in transmission without needing synchronizing the Baud rate of the UART connector 1ST, and the host electronic device 2 is also able to apply a data amending process to the transmitted data in case of not destructing the accuracy of the transmitted data. The reason is that the heard data is acquired after the transmitted data is decoded, and the data amending process is conducted before the data transmission. As explained in detail below, the data monitoring and the data amendment are both conducted in the bridge device 1 instead of the UART connector 1ST, such that it does not need to synchronize the Baud rate as conducting the data monitoring or the data amendment. In addition, the bridge device 1 further provides the host electronic device 2 to change the Baud rate of the UART connector 1ST.

(3) On the other hand, in case of the host electronic device 2 utilizing one virtual COM port to transmit a first data to or receive a second data from the electronic device 3, the host electronic device 2 is able to incorporate an additional data into the first data or the second data through at least one of the other two virtual COM ports.

Therefore, through above descriptions, all embodiments and their constituting elements of the bridge device having data monitoring function and the USB to UART converter proposed by the present invention have been introduced completely and clearly. Moreover, the above description is made on embodiments of the present invention. However, the embodiments are not intended to limit the scope of the present invention, and all equivalent implementations or alterations within the spirit of the present invention still fall within the scope of the present invention.

What is claimed is:
1. A bridge device, comprising:
 a USB unit for being electrically connected to a USB interface;
 a UART unit for being electrically connected to a UART interface;
 a plurality of interface units, comprising a first interface unit, a second interface unit and a third interface unit all coupled to the USB unit;
 a plurality of data buffer units, comprising a first data buffer unit coupled to the second interface unit, a second data buffer unit coupled to the first interface unit, and a third data buffer unit coupled to the third interface unit;
 a data diverting unit, being coupled to the first data buffer unit, the second data buffer unit and the third data buffer unit;

a FIFO unit, being coupled between the data diverting unit and the UART unit, and comprising a control buffer; and a control endpoint (EP0), being coupled to the control buffer;

wherein the USB unit communicates with a host electronic device through the USB interface, and the UART unit communicating with an electronic device through the UART interface;

wherein in case of the electronic device transmitting a first serial data to the UART interface, the UART unit receiving the first serial data through the UART interface by a first Baud rate, and then the first serial data is transmitted to the second data buffer unit and the third data buffer unit through the FIFO unit and the data diverting unit, such that the USB unit is able to receive the first serial data through the first interface unit and the third interface unit;

wherein in case of the host electronic device transmitting a first USB data to the USB interface, the USB unit receiving the first USB data through the USB interface and subsequently temporarily storing the first USB data in the second data buffer unit, and then the data diverting unit transmits the first USB data to the FIFO unit after acquiring the first USB data by reading the second data buffer unit, such that the UART unit is able to receive the first USB data from the FIFO unit;

wherein the second data buffer unit diverts the first USB data to the first data buffer unit before transmitting the first USB data to the data diverting unit, such that the USB unit is able to receive the first USB data from the second interface unit.

2. The bridge device of claim 1, wherein during the electronic device transmitting the first serial data to the host electronic device via said bridge device, the host electronic device being able to transmit an additional data to the USB unit, such that the data diverting unit cooperates with the third data buffer unit and the third interface unit so as to incorporate the additional data into the first serial data.

3. The bridge device of claim 1, wherein during the host electronic device transmitting the first USB data to the electronic device via said bridge device, the host electronic device being able to transmit an additional data to the USB unit, such that the data diverting unit cooperates with the first data buffer unit and the second interface unit so as to incorporate the additional data into the first USB data.

4. The bridge device of claim 1, wherein said bridge device 1 is presented by a form of integrated circuit (IC) chip, complex programmable logic device (CPLD) chip or field programmable gate array (FPGA) chip.

5. The bridge device of claim 1, wherein the USB interface comprises a first USB connector, and the UART interface comprising a first UART connector.

6. The bridge device of claim 5, wherein the first UART connector is one selected from a group consisting of RS232 connector, RS422 connector and RS485 connector.

7. The bridge device of claim 1, further comprising:
a memory, being electrically connected to the control buffer;
a GPIO unit, being electrically connected to the control buffer, and comprising at least one GPIO pin for being coupled to the electronic device.

8. The bridge device of claim 7, wherein the FIFO unit comprises:
said control buffer, being coupled to the control endpoint (EP0), the memory and the GPIO unit;

a first FIFO, being coupled to the data diverting unit and the UART unit;
a second FIFO, being coupled to the data diverting unit and the UART unit; and
a third FIFO, being coupled to the UART unit, the first data buffer unit, the second data buffer unit, and the third data buffer unit.

9. The bridge device of claim 8, wherein the USB unit comprises:
a USB physical layer (PHY) unit, being coupled to the USB interface; and
a USB serial interface engine (SIE) unit, being coupled to the USB PHY unit, the control endpoint (EP0), the first interface unit, the second interface unit and the third interface unit.

10. The bridge device of claim 9, wherein the UART unit comprises:
a controller, being coupled to the third FIFO and the UART interface;
a data transmitting buffer, being coupled to the controller and the first FIFO; and
a data receiving buffer, being coupled to the controller and the second FIFO.

11. The bridge device of claim 9, wherein the data diverting unit comprises:
a first multiplexer, having a first input terminal, a second terminal and an output terminal, wherein the first input terminal is coupled to the first data buffer unit, the second input terminal being coupled to the second data buffer unit, and the output terminal being coupled to the first FIFO; and
a second multiplexer, also having a first input terminal, a second terminal and an output terminal, wherein the output terminal is coupled to the second data buffer unit, the first input terminal being coupled to the second FIFO, and the second input terminal being coupled to the third data buffer unit;
wherein the first data buffer unit is also coupled between the second input terminal of the first multiplexer and the second data buffer unit.

12. The bridge device of claim 11, wherein the first data buffer unit comprises:
a first buffer, being coupled to the second interface unit and the third FIFO;
a second buffer, being coupled to the second interface unit and the first input terminal of the first multiplexer; and
a third buffer, being coupled to the second interface unit, and being also coupled between the second data buffer unit and the second input terminal of the first 10 multiplexer.

13. The bridge device of claim 12, wherein the second data buffer unit comprises:
a fourth buffer, being coupled to the first interface unit, the second input terminal of the first multiplexer and the third buffer;
a fifth buffer, being coupled to the first interface unit and the third FIFO; and
a sixth buffer, being coupled to the first interface unit and the output terminal of the second multiplexer.

14. The bridge device of claim 13, wherein the third data buffer unit comprises:
a seventh buffer, being coupled to the third interface unit and the second input terminal of the second multiplexer;
an eighth buffer, being coupled to the third interface unit, and being also coupled between the second FIFO and the first input terminal of the second multiplexer; and a ninth buffer, being coupled to the third interface unit and the third FIFO.

15. The bridge device of claim 14, wherein the first interface unit comprises:
a first endpoint, being coupled to the USB unit and the fifth buffer;
a second endpoint, being coupled to the USB unit and the fourth buffer; and
a third endpoint, being coupled to the USB unit and the six buffer.

16. The bridge device of claim 15, wherein the second interface unit comprises:
a fourth endpoint, being coupled to the USB unit and the first buffer;
a fifth endpoint, being coupled to the USB unit and the second buffer; and
a sixth endpoint, being coupled to the USB unit and the third buffer.

17. The bridge device of claim 16, wherein the third interface unit comprises:
a seventh endpoint, being coupled to the USB unit and the ninth buffer;
an eighth endpoint, being coupled to the USB unit and the seventh buffer; and
a ninth endpoint, being coupled to the USB unit and the seventh buffer.

18. The bridge device of claim 1, wherein the host electronic device is one selected from a group consisting of laptop computer, desktop computer, all-in-one computer, industrial computer, and server computer.

19. A USB to UART converter, comprising a printed circuit board, a USB connector, a UART connector and a bridge device, wherein the USB connector, the UART connector and the bridge device are all disposed on the printed circuit board, and the bridge device being electrically connected to the USB connector and the UART connector; characterized in that the ridge device comprises:
a USB unit for being electrically connected to a USB interface;
a UART unit for being electrically connected to a UART interface;
a plurality of interface units, comprising a first interface unit, a second interface unit and a third interface unit all coupled to the USB unit;
a plurality of data buffer units, comprising a first data buffer unit coupled to the second interface unit, a second data buffer unit coupled to the first interface unit, and a third data buffer unit coupled to the third interface unit;
a data diverting unit, being coupled to the first data buffer unit, the second data buffer unit and the third data buffer unit;
a FIFO unit, being coupled between the data diverting unit and the UART unit, and comprising a control buffer; and
a control endpoint (EP0), being coupled to the control buffer;
wherein the USB unit communicates with a host electronic device through the USB interface, and the UART unit communicating with an electronic device through the UART interface;
wherein in case of the electronic device transmitting a first serial data to the UART interface, the UART unit receiving the first serial data through the UART interface by a first Baud rate, and then the first serial data is transmitted to the second data buffer unit and the third data buffer unit through the FIFO unit and the data diverting unit, such that the USB unit is able to receive the first serial data through the first interface unit and the third interface unit;
wherein in case of the host electronic device transmitting a first USB data to the USB interface, the USB unit receiving the first USB data through the USB interface and subsequently temporarily storing the first USB data in the second data buffer unit, and then the data diverting unit transmits the first USB data to the FIFO unit after acquiring the first USB data by reading the second data buffer unit, such that the UART unit is able to receive the first USB data from the FIFO unit;
wherein the second data buffer unit diverts the first USB data to the first data buffer unit before transmitting the first USB data to the data diverting unit, such that the USB unit is able to receive the first USB data from the second interface unit.

20. The USB to UART converter of claim 19, wherein the USB to UART converter is adopted for being electrically connected between a host electronic device and an electronic device, such that the host electronic device is able to transmit a first data to and/or receive a second data from the electronic, the host electronic device being also able to hear the first data and/or the second data without needing to conduct a Baud rate synchronization, and the host electronic device being also able to amend the first data and/or the second data.

* * * * *